United States Patent
Lachner et al.

(10) Patent No.: US 7,477,776 B2
(45) Date of Patent: Jan. 13, 2009

(54) METHOD AND APPARATUS FOR DETERMINING A PLANE OF SYMMETRY OF A THREE-DIMENSIONAL OBJECT

(75) Inventors: Rainer Lachner, Poing (DE); Gregor Tuma, München (DE); Stefan Vilsmeier, Kufstein (AT)

(73) Assignee: BrainLAB AG, Feldkirchen (DE)

( * ) Notice: Subject to any disclaimer, the term of this patent is extended or adjusted under 35 U.S.C. 154(b) by 863 days.

(21) Appl. No.: 11/069,916

(22) Filed: Mar. 1, 2005

(65) Prior Publication Data
US 2005/0200624 A1    Sep. 15, 2005

Related U.S. Application Data (60) Provisional application No. 60/555,838, filed on Mar. 24, 2004.

(30) Foreign Application Priority Data
Mar. 1, 2004   (EP) .................................. 04004652

(51) Int. Cl.
G06K 9/00 (2006.01)
G06K 9/36 (2006.01)
(52) U.S. Cl. ........................ 382/154; 382/128; 382/131; 382/276; 382/291
(58) Field of Classification Search ................ 382/128, 382/131, 132, 154, 276, 278, 285, 291
See application file for complete search history.

(56) References Cited

U.S. PATENT DOCUMENTS

| 5,799,055 | A | 8/1998 | Peshkin et al. |
| 5,889,892 | A * | 3/1999 | Saito ........................... 382/293 |
| 6,317,621 | B1 * | 11/2001 | Graumann et al. .......... 600/424 |
| 6,359,960 | B1 | 3/2002 | Wahl et al. |
| 6,366,797 | B1 * | 4/2002 | Fisher et al. ................. 600/410 |
| 6,591,004 | B1 * | 7/2003 | VanEssen et al. ........... 382/154 |
| 2003/0153829 | A1 | 8/2003 | Sarin et al. |

FOREIGN PATENT DOCUMENTS

| DE | 101 37 655 | 6/2002 |
| WO | 99/59106 | 11/1999 |
| WO | 02/062248 | 8/2002 |
| WO | 03/060827 | 7/2003 |

* cited by examiner

Primary Examiner—Matthew C Bella
Assistant Examiner—John B Strege
(74) Attorney, Agent, or Firm—Renner, Otto, Boisselle & Sklar, LLP (57) ABSTRACT

A method and apparatus for determining the position of a plane of symmetry of a three-dimensional object from at least two two-dimensional mappings, wherein the mappings are obtained from different directions. At least one characteristic line of the three-dimensional object is determined in one of the two-dimensional mappings, and at least one of the two two-dimensional mappings is morphed. The at least one characteristic line is transferred onto the other two-dimensional mapping, and the characteristic lines from the two-dimensional mappings are back-projected to obtain a three-dimensional curve corresponding to the characteristic lines. A plane of symmetry of the object is ascertained from the course of the three-dimensional curve.

20 Claims, 10 Drawing Sheets

Epipolar Geometry

FIG. 5A     FIG. 5B

Rectification

FIG. 6A     FIG. 6B

User Input

FIG. 7A  FIG. 7B

Workflow

METHOD AND APPARATUS FOR DETERMINING A PLANE OF SYMMETRY OF A THREE-DIMENSIONAL OBJECT

RELATED APPLICATION DATA

This application claims priority of U.S. Provisional Application No. 60/555,838 filed on Mar. 24, 2004, which is incorporated herein by reference in its entirety.

FIELD OF THE INVENTION

The invention relates to a method and apparatus for determining a plane of symmetry of a three-dimensional object, particularly where the object is a part of a living body.

BACKGROUND OF THE INVENTION

In medical and non-medical procedures, it often is desirable to ascertain the position of a plane of symmetry of an at least partially symmetrical body. In cranial and extra-cranial image-guided surgery (IGS), for example, it often is desirable to determine the mid-sagittal plane. Determining this plane is relatively easy, provided a three-dimensional image of the structure under observation is available. Such an image can be obtained, for example, via computer tomography or nuclear spin resonance recording. Methods for ascertaining the position of a plane of symmetry from three-dimensional images of structures are known in the prior art. Generally speaking, the plane of symmetry is found by determining which symmetrical structures of the three-dimensional body correspond to each other. Based on this determination, the plane of symmetry is calculated.

In hip surgery, determining the position of the mid-sagittal plane is very important, particularly if a new joint cavity is to be inserted into the hip. This is due to the fact that the exact position of the new joint cavity depends on various factors, one of which is the position of the mid-sagittal plane.

In determining the mid-sagittal plane of the hip, two characteristic points or so-called spinal points are established on the hip. Establishing these points, however, often is problematic since easy access to the characteristic points (for example by means of a pointer) is not possible due to the position of the patient (e.g., lying on their side) or due to tissue layers located over the hip and, therefore, over the characteristic points. Additionally, three dimensional images of the hip may not be readily available.

SUMMARY OF THE INVENTION

The present invention provides a method and apparatus for determining the spatial position of a plane of symmetry of a three-dimensional object using two or more two-dimensional images of the three-dimensional object. Additionally, the present invention provides a method and apparatus whereby this can be done without a need to physically establish characteristic points on the object.

According to one aspect of the invention, a method for determining the position of a plane of symmetry of a three-dimensional object, comprises the steps of identifying at least one characteristic curve on a first mapping of a plurality of two-dimensional mappings; morphing at least the first mapping into a second mapping of the plurality of two-dimensional mappings such that the first mapping and the second mapping are substantially congruent; transferring the at least one characteristic curve to the second mapping; back-projecting the characteristic curve of the first and second mapping to obtain a three-dimensional course corresponding to the characteristic curve of the first and second mapping; and ascertaining the plane of symmetry of the three-dimensional object from the three-dimensional course.

According to another aspect of the invention, a program embodied in a computer-readable medium for determining the position of a plane of symmetry of a three-dimensional object from a plurality of two-dimensional mappings, comprises code that identifies at least one characteristic curve on a first mapping of the plurality of two-dimensional mappings; code that morphs at least the first mapping into a second mapping of the plurality of two-dimensional mappings such that the first mapping and the second mapping are substantially congruent; code that transfers the at least one characteristic curve to the second mapping; code that back-projects the characteristic curve of the first and second mapping to obtain a three-dimensional course corresponding to the characteristic curve of the first and second mapping; and code that ascertains the plane of symmetry of the three-dimensional object from the three-dimensional course.

According to a further aspect of the invention, a system for determining the position of a plane of symmetry of a three-dimensional object from a plurality of two-dimensional mappings, comprises a processor circuit having a processor and a memory; position determining code stored in the memory and executable by the processor, the position determining code including logic that identifies at least one characteristic curve on a first mapping of a plurality of two-dimensional mappings; logic that morphs at least the first mapping into a second mapping of the plurality of two-dimensional mappings such that the first mapping and the second mapping are substantially congruent; logic that transfers the at least one characteristic curve to the second mapping; logic that back-projects the characteristic curve of the first and second mapping to obtain a three-dimensional course corresponding to the characteristic curve of the first and second mapping; and logic that ascertains the plane of symmetry of the three-dimensional object from the three-dimensional course.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The foregoing and further features of the present invention will be apparent with reference to the following description and drawings, wherein.

DETAILED DESCRIPTION

As above noted, the present invention provides a method and apparatus for determining a plane of symmetry of a three-dimensional object. The three-dimensional object can be partially or completely symmetrical, such as, for example, a hip bone, a cranial bone or other symmetrical structure of the body.

In determining the plane of symmetry of the three-dimensional object, two or more two-dimensional mappings or images of the object are acquired from two different directions or two different angles. The images, for example, can be two x-ray images taken from different directions or different angles, e.g., a side x-ray and a front x-ray of the object.

After obtaining the two or more images of the object, at least one characteristic curve or line of the three-dimensional object is determined in one of the two-dimensional images. A characteristic line or curve, as used herein, refers to a line or curve that identifies a particular or pronounced feature of the object. For ease in description, the term "characteristic curve" as used herein is to be construed to include a characteristic line (an curve with an infinite radius) unless otherwise indicated.

The chosen characteristic curve preferably is a symmetrical curve of the three-dimensional object that can be easily identified in the two-dimensional image, such as, for example, an elevation and/or boundary of the three-dimensional object. In the case of a hip bone, for example, the crest of the hip bone or a curve on an upper or lower edge of the pubic bone or the ischium can be used as the characteristic curve.

As will be described below in more detail, a plurality of epi-polar lines can be generated on at least two mapping planes and the plurality of epi-polar lines can be rectified. Rectification parallelizes the epi-polar lines, thereby minimizing a global distortion.

Once the epi-polar lines are rectified, one of the two two-dimensional images of the three-dimensional object is morphed such that it looks like or otherwise takes on the shape of the other two-dimensional image. Morphing, as used herein, refers to the transformation of one image, e.g., a source image, to another image, e.g., a target image. The transformation can be accomplished by warping or otherwise deforming the source image to resemble features of the target image. Alternatively, both two-dimensional images of the 3-dimensional object can be morphed such that they are identical to each other, e.g., an average of the two images. Morphing methods are known in the art and, for example, are described in GE Christensen, "Deformable shape models for anatomy." Electrical engineering D.Sc. Dissertation, Washington University, St. Louis, Mo., August 1994, the contents of which is hereby incorporated by reference in its entirety.

Figure 1:
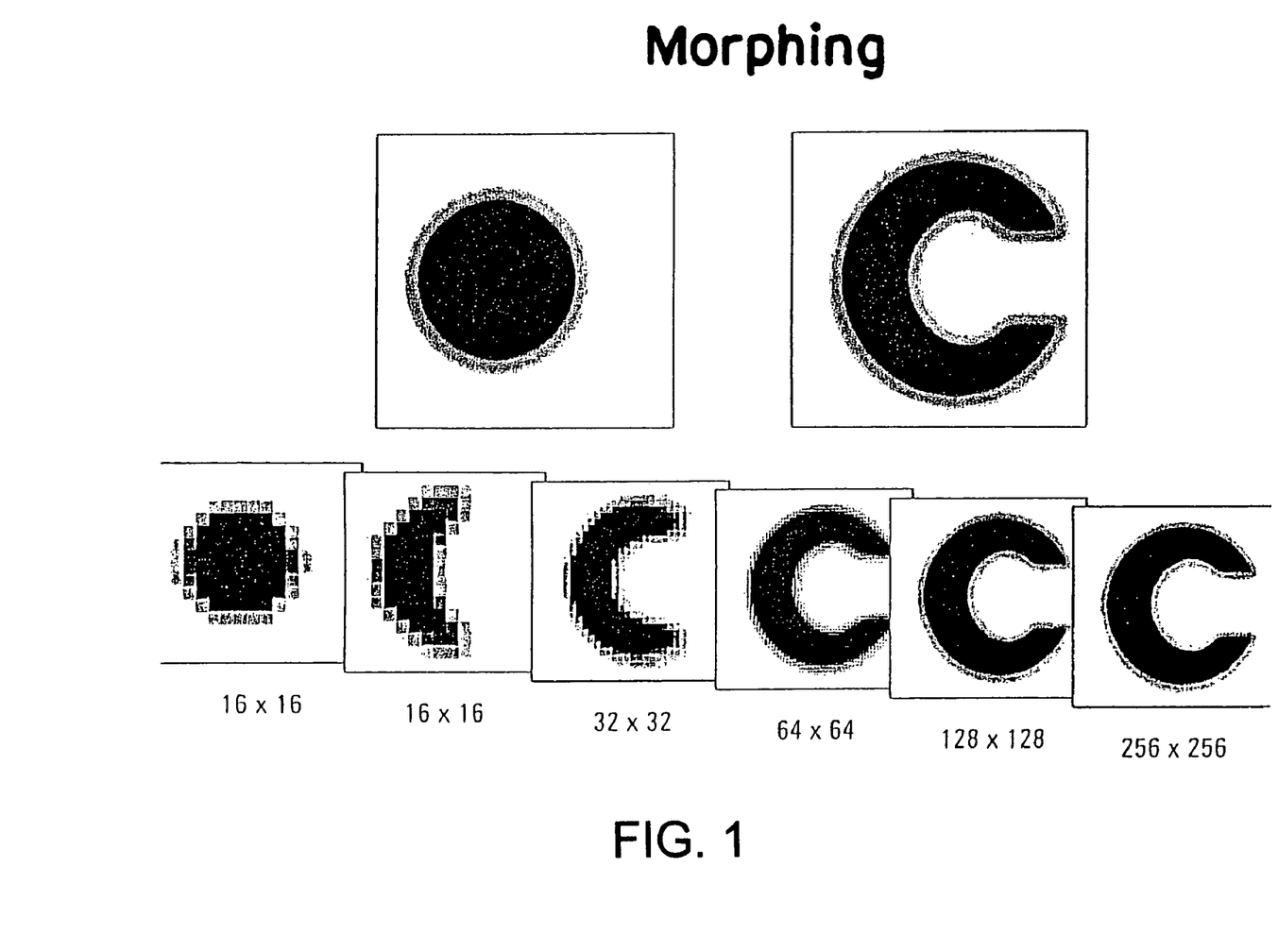
FIG. 1 is a schematic representation of a circle being morphed into the letter "C" in accordance with the prior art.

FIG. 1 illustrates an example of a circle being two-dimensionally morphed into a capital "C". In a first step, the resolution is reduced to 16×16 pixels and the image is matched. Once successfully matched at low resolution, the resolution is increased and a matching method is performed again, these steps being repeated until the images match at full resolution. Thus, using a morphing method, a mapping instruction can be found wherein one image is mapped onto another, and the mapping instruction can be regarded as a deformation field.

Once morphing has been performed on at lease one of the two-dimensional images, then the at least one characteristic curve, which previously had been ascertained on one of the two-dimensional images, can be transferred onto the other two-dimensional image. For example, the warping or deformation function applied to the first two-dimensional image during the morphing process also can be applied to the at least one characteristic curve identified on the first two-dimensional image, thereby transferring the at least one characteristic curve to the second image. After the at least one characteristic curve has been transferred from the first image to the second image, the at least one characteristic curve can be back projected to ascertain a 3-dimensional course of the characteristic curve on the mapped object. Once the 3-dimensional course of the at least one characteristic curve is known, then a plane of symmetry with respect to the three-dimensional course can be found. Moreover, the plane of symmetry of the three-dimensional course is the plane of symmetry of the mapped three-dimensional object.

Figure 2:
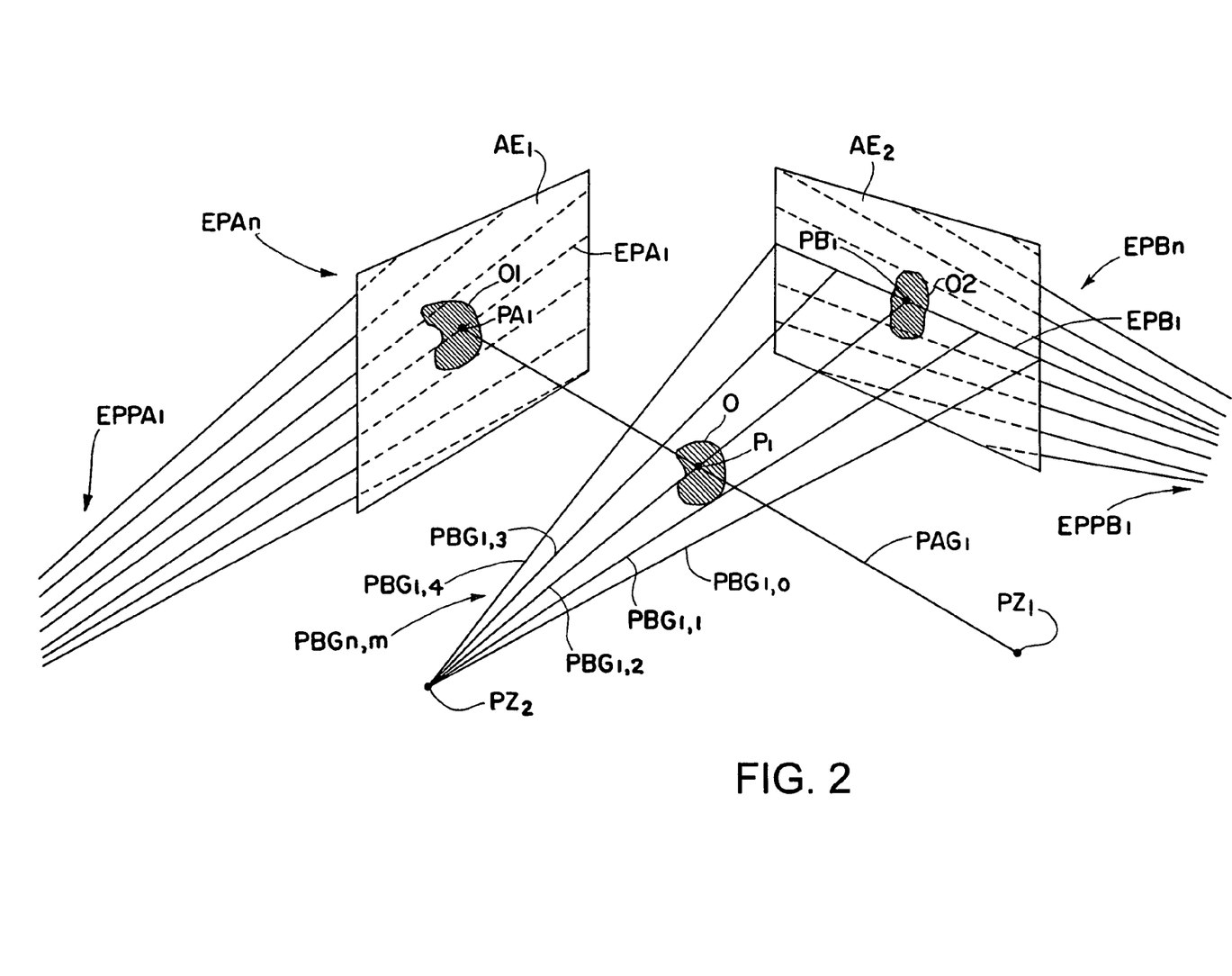
FIG. 2 is a schematic representation of the mapping of an object point onto two mapping planes in accordance with an embodiment of the invention.

In accordance with an embodiment of the invention, one or more points $PA_n$, wherein n is an integer from 1 to the total number of points mapped, are automatically or manually selected in a first two-dimensional image $O_1$ of a three dimensional object $O_1$ as shown in FIG. 2. The point $PA_1$ can be generated, for example, by starting from a first center of projection $PZ_1$ and mapping an object point $P_1$ onto a first two-dimensional mapping plane $AE_1$. Additional points $PA_n$ can be mapped by selecting additional points $P_n$ on the three-dimensional image O and mapping the points to the first mapping plane $AE_1$ as described above.

A first straight projection line $PAG_1$, which is defined by a line that intersects the first center of projection $PZ_1$, the object point $P_1$ and the mapping plane $AE_1$ at the point $PA_1$, is mapped onto a second mapping plane $AE_2$. More specifically, the first projection line $PAG_1$ is mapped onto the second mapping plane $AE_2$ by projecting the line $PAG_1$ from the second center of projection $PZ_2$ onto a straight epi-polar line $EPB_1$ of the second mapping plane $AE_2$, wherein the object point $PB_2$ lies on the epi-polar line $EPB_1$.

In accordance with the invention, an assigned epi-polar line $EPB_n$ in the second mapping plane $AE_2$ is generated for a number of or for each of the points $PA_n$ in the first mapping. The epi-polar lines can be generated using a known spatial arrangement, which is determined from individual recordings of the three-dimensional object O. Corresponding epi-polar lines $EPA_n$ in the first mapping plane are then assigned to the epi-polar lines $EPB_n$ that were ascertained in the second mapping plane. The corresponding epi-polar lines $EPA_n$ can be interpreted as a mapping of the projection beams $PBG_{n,m}$, where m is an integer corresponding to the particular projection line of the group of projection lines used to form an epi-polar line on the mapping plane $AE_2$. For example, the projection lines $PBG_{1,m}$ are mapped onto the first mapping plane $AE_1$ by projecting the lines $PBG_{1,m}$ from the first center of projection $PZ_1$ onto a straight epi-polar line $EPA_1$ of the second mapping plane $AE_1$, wherein the object point $PA_1$ lies on the epi-polar line $EPA_1$.

The at least two two-dimensional mappings of the three-dimensional object can be generated by recordings, e.g., by means of x-rays or so-called fluoro-shots, the recordings being taken from different angles. Alternatively, the recordings of the object can be taken from two different directions, wherein the centers of projection enclose an angle of about 5 degrees to about 30 degrees, e.g., an angle of 10 degrees, with the object. More than two recordings of the object also can be taken from different directions, wherein the method described above is performed using a pair of the plurality of two-dimensional mappings of the three-dimensional object, and then using another pair of the plurality of two-dimensional mappings. This can be advantageous, for example, in that the accuracy of the ascertained plane of symmetry of the three-dimensional object can be increased.

Additionally, a reference star or marker can be attached to the three-dimensional object to be mapped. Reference stars are well known in the art and generally include three or four arms extending outwards with reflective markers attached to the outer ends of the arms. A known navigation system that uses the reference star described above is the image-assisted navigation system VectorVision™, available from BrainLAB AG, and described, for example, in U.S. Patent Publication No. 2003/0225329, which is hereby incorporated by reference. The reference star can be used to ascertain the spatial relationship of the three-dimensional object relative to the centers of projection and to the assigned mapping planes, wherein these localization data can be used to perform the method in accordance with the invention.

As was noted previously, a characteristic curve of the three-dimensional object used in accordance with the invention can be a boundary or a rim of the three-dimensional object, such as, for example, a curve lying on an upper and/or lower edge of the pubic bone or the ischium. In one embodiment, such curves are ascertained automatically by live-wire. Such techniques, for example, are described by W. A. Barnett, E. N. Motensen, "Interactive live-wire boundary extraction." Medical Image Analysis. 1(4):331-341, 1997; "Live-wire", M. Kass, A. Witkin, D. Terzopoulos; "Snakes: Active contour models." International Journal of Computer Vision, 1(4):321-331, 1988), both of which are hereby incorporated by reference. Alternatively, the characteristic curve or curves can be manually selected and entered into a two-dimensional mapping of the three-dimensional object. For example, a user can analyze the two-dimensional mappings and identify a characteristic curve of the object. Once identified, the user can indicate to a computing device the identified characteristic curve, e.g., drag a mouse across the identified region that is displayed on a screen. Preferably, characteristic curves are selected that exhibit symmetry and have an approximate or complete symmetrical course on both sides of the plane of symmetry.

The at least two two-dimensional mappings can be rectified before morphing is performed. More specifically, the epi-polar lines $EPA_n$, $EPB_n$ ascertained in the individual two-dimensional mapping planes $AE_1$, $AE_2$ are made parallel or "parallelized" such that a global image distortion is minimized. The remaining degrees of freedom can be used to minimize image forming.

Determining the plane of symmetry from the reconstructed three-dimensional course of the at least one characteristic curve can be regarded as a non-linear least squares problem. The plane of symmetry can be ascertained using known minimizing methods, such as, for example, the known Levenberg-Marquard method. The point-curve distance calculations are significantly accelerated by using kd trees as described in J. L. Bentley, "Multidimensional Binary Search Trees Used for Associative Searching." Coummun. ACM 18(9):509-517, 1975, the contents of which is hereby incorporated by reference.

Figure 3A:
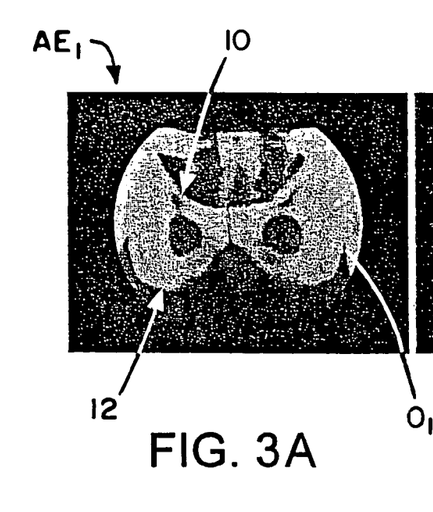
FIGS. 3A and 3B illustrate two two-dimensional mappings of a three-dimensional object, each taken from different angles in accordance with an embodiment of the invention.
Figure 3B:
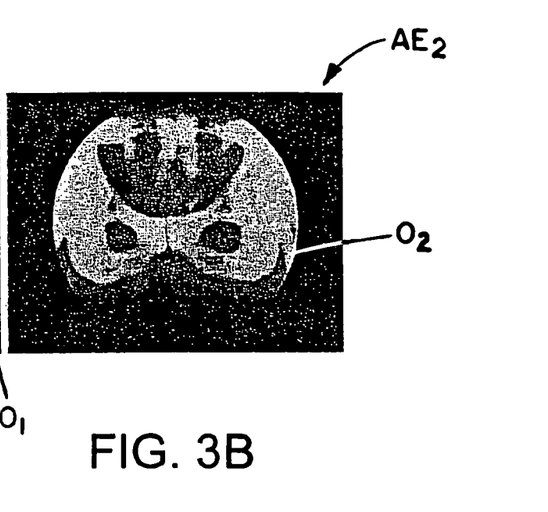
Figure 4A:
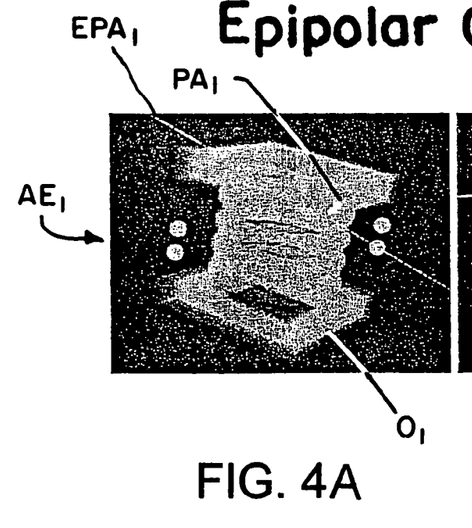
FIGS. 4A and 4B illustrate two mappings of an object showing a single epi-polar line of the object in accordance with an embodiment of the invention.
Figure 4B:
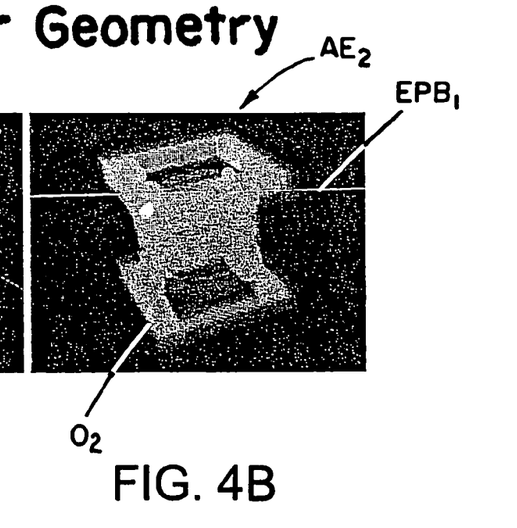

With continued reference to FIG. 2 and further reference to FIGS. 3A through 7B, an exemplary method of the present invention will be described. FIG. 2 schematically shows a three-dimensional object O, such as a hip bone, for example, that is mapped or projected onto two projection or mapping planes $AE_1$ and $AE_2$. FIGS. 3A and 3B illustrate two x-ray recordings of the hip bone taken from different directions. Initially, two characteristic curves 10 and 12 are identified on one of the x-ray recordings. The selected characteristic curves 10, 12 pass along the upper and/or lower edge of the pubic bone and the ischium and usually have approximately the same plane of symmetry as that of the three-dimensional object, e.g., the actual hip bone. As will be appreciated, characteristic curves other than those identified may be selected without departing from the scope of the invention.

An object point $P_1$ lying in or on the object O is mapped to the image point $PA_1$. More particularly, a projection line $PAG_1$, such as an that formed by an x-ray, for example, starts at the center of projection $PZ_1$ and passes through the object point $P_1$ and strikes the mapping plane $AE_1$. The x-ray generates the image point $PA_1$ on the mapping plane $AE_1$.

The projection line $PAG_1$ can be projected onto the second mapping plane $AE_2$ to form epi-polar lines. For example, starting from the second center of projection $PZ_2$, the straight projection line $PAG_1$ is projected onto the second mapping plane $AE_2$, thereby generating the epi-polar line $EPB_1$ on the mapping plane $AE_2$. Moreover, the image point $PB_1$, which lies in the mapping plane $AE_2$ and corresponds to the image point $PA_1$, lies on the epi-polar line $EPB_1$.

Using a number of points in the mapping plane $AE_1$, a number of epi-polar lines $EPB_n$ can be generated in the second mapping plane $AE_2$. The straight projection lines $PBG_{n,m}$ assigned to a particular epi-polar line $EPB_n$ of the second mapping plane $AE_2$, are mapped onto the mapping plane $AE_1$ by projecting the projection lines $PBG_{n,m}$ from the first center of projection $PZ_1$ onto corresponding epi-polar lines $EPA_n$.

The epi-polar lines $EPA_n$ intersect the first epi-pole $EPPA_1$ and the epi-polar lines $EPB_n$ intersect the second epi-pole $EPPB_1$, wherein the two centers of projection $PZ_1$ and $PZ_2$ lie on a straight connecting line of the two epi-poles $EPPA_1$ and $EPPB_1$.

FIGS. 4A-6B illustrate the epi-polar geometry of an object. A point $PA_1$ is selected in FIG. 4A and, as shown in FIG. 4B, the epi-polar line $EPB_1$ pertaining to the point $PA_1$ is ascertained, as described above with respect to FIG. 2. As was discussed above, a point corresponding to the selected point $PA_1$ must lie on the epi-polar line $EPB_1$. Conversely, a corresponding epi-polar line $EPA_1$ in FIG. 4A pertains to any given point on the epi-polar line $EPB_1$ of FIG. 4B. If the corresponding epi-polar lines in the images are generated for a multitude of points, epi-polar lines $EPA_n$, $EPB_n$ can be found distributed over the recordings as a whole, as shown schematically in FIGS. 5A and 5B, wherein the images are only morphed along the epi-polar lines.

Figure 5A:
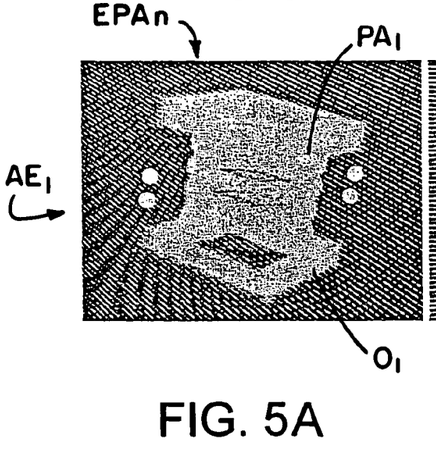
FIGS. 5A and 5B illustrate two mappings of the object of FIGS. 4A and 4B, respectively, each showing a multitude of epi-polar lines distributed over the object in accordance with an embodiment of the invention.
Figure 5B:
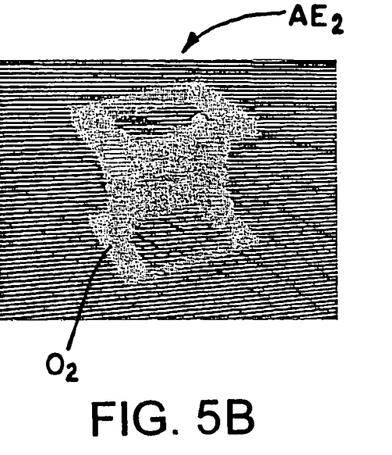
Figure 6A:
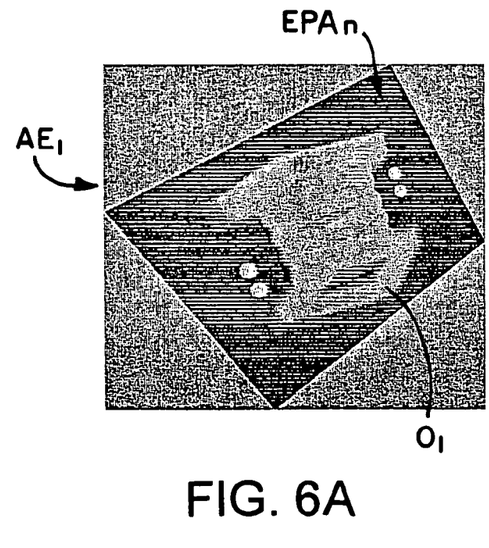
FIGS. 6A and 6B illustrate the images of FIGS. 5A and 5B, respectively, after the epi-polar lines have been rectified in accordance with an embodiment of the invention.
Figure 6B:
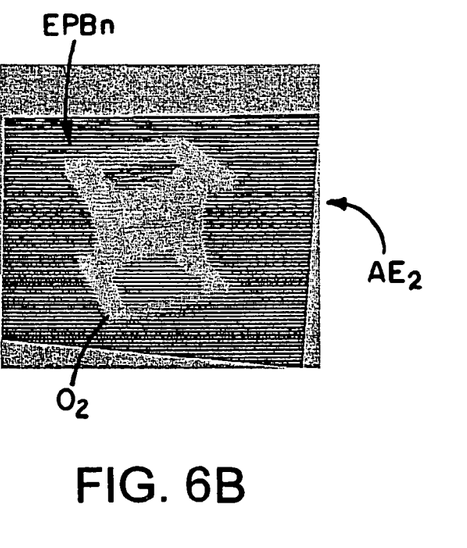

FIGS. 6A and 6B show the images of FIGS. 5A and 5B after they have been rectified, wherein a line-by-line correspondence of the images is produced. After rectification, a point $PA_n$ of the mapping plane $AE_1$ lying on an epi-polar line $EPA_n$ has a corresponding point $PB_n$ lying in the same line $EPB_n$ of the mapping plane $AE_2$, which enables morphing to be performed more efficiently. Rectification can always be performed when the epi-poles are outside the image sequences, which is generally the case if the angle at which the images were taken is not too large, e.g., not over 30 degrees.

A conventional morphing method is then performed, wherein the two images are elastically matched. As was noted above, one image can be deformed or warped such that it is congruent with the other image, or both images can be deformed or warped into an average of the two images. In particular, the morphing can be performed only at the epi-polar lines.

Figure 7A:
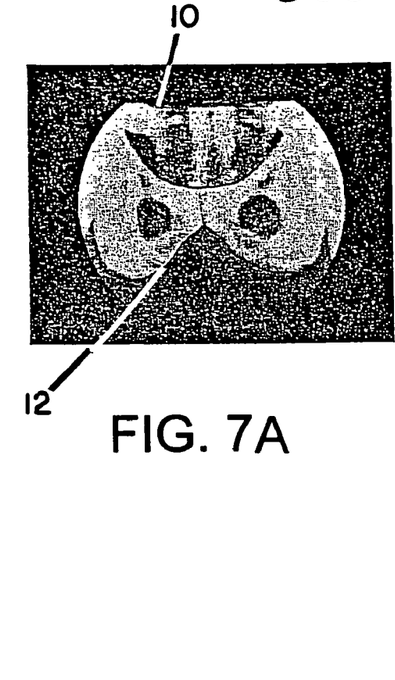
FIG. 7 illustrates two morphed mappings of the object in accordance with an embodiment of the invention, wherein the two mappings are approximately congruent, and the characteristic lines are present only on one mapping.
Figure 7B:
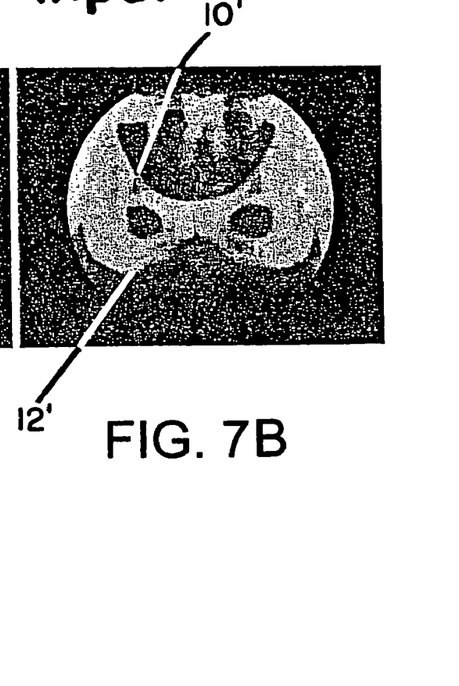

Once the mappings of FIGS. 3A and 3B have been morphed, the two recordings of the hip are approximately congruent, as shown in FIGS. 7A and 7B. The two characteristic curves 10, 12 of FIG. 3A and FIG. 7A, e.g., the curves that pass along the upper and/or lower edge of the pubic bone and the ischium, now are transferred to FIG. 7B.

Figure 8A:
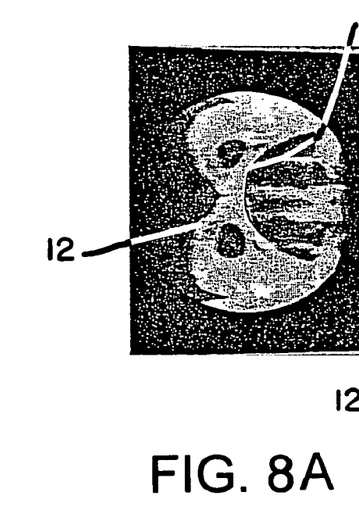
FIG. 8 illustrates two mappings of the object, with the characteristic lines transferred onto the second mapping in accordance with an embodiment of the invention.
Figure 8B:
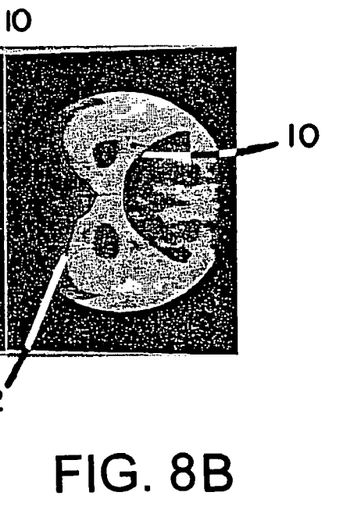

The mapping instruction found during morphing of FIG. 3A is used to deform the characteristic curves 10, 12 indicated in FIG. 7A, such that they lie on the corresponding points of the hip as the characteristic curves 10', 12' of FIG. 7B. The transferred curves and resulting image are shown in FIGS. 8A and 8B.

Figure 9:
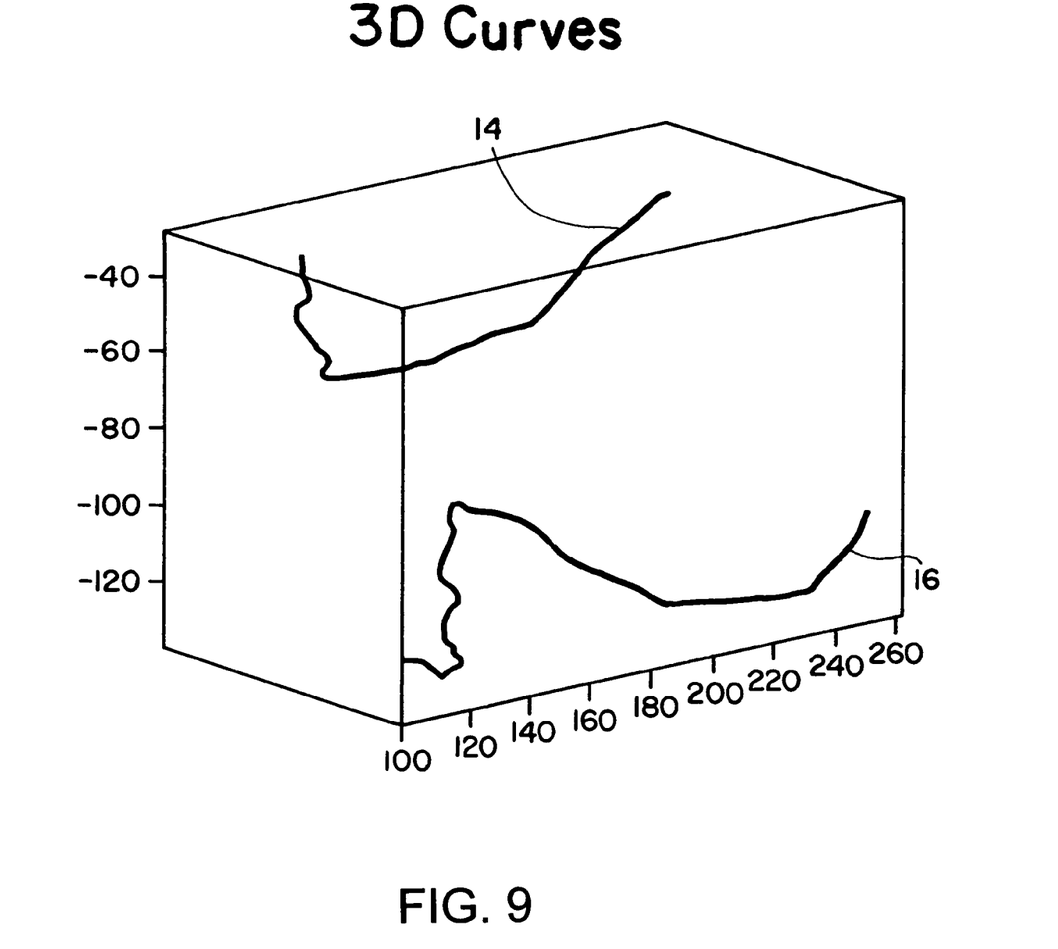
FIG. 9 is a schematic representation of a three-dimensional course of two characteristic lines in accordance with an embodiment of the invention.
Figure 10:
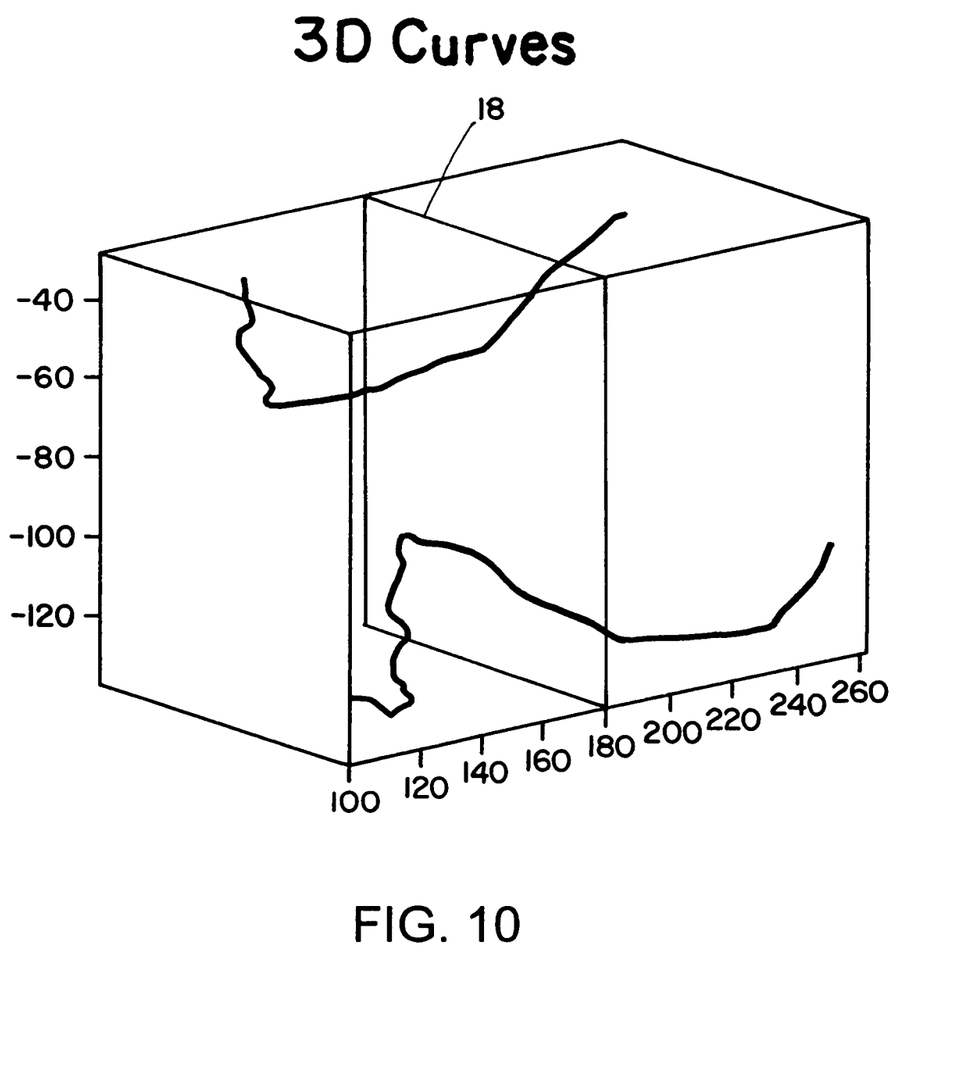
FIG. 10 is a schematic representation of the plane of symmetry with respect to the characteristic lines shown in FIG. 9.

Spatial three-dimensional curves 14, 16 can be obtained from: 1) the mapping instruction ascertained during morphing; 2) the course of the characteristic curves in the two mappings; and 3) the localization data of the mappings, by back-projecting the corresponding two two-dimensional curves 10, 12 in the rectified images of FIGS. 6A and 6B, as shown schematically in FIG. 9. Using conventional techniques, the plane of maximum symmetry with respect to the two curves shown in FIG. 9 is then ascertained, wherein the plane of symmetry 18 of the curves indicated in FIG. 10 is also simultaneously the plane of symmetry of the hip and/or recorded object.

Figure 11:
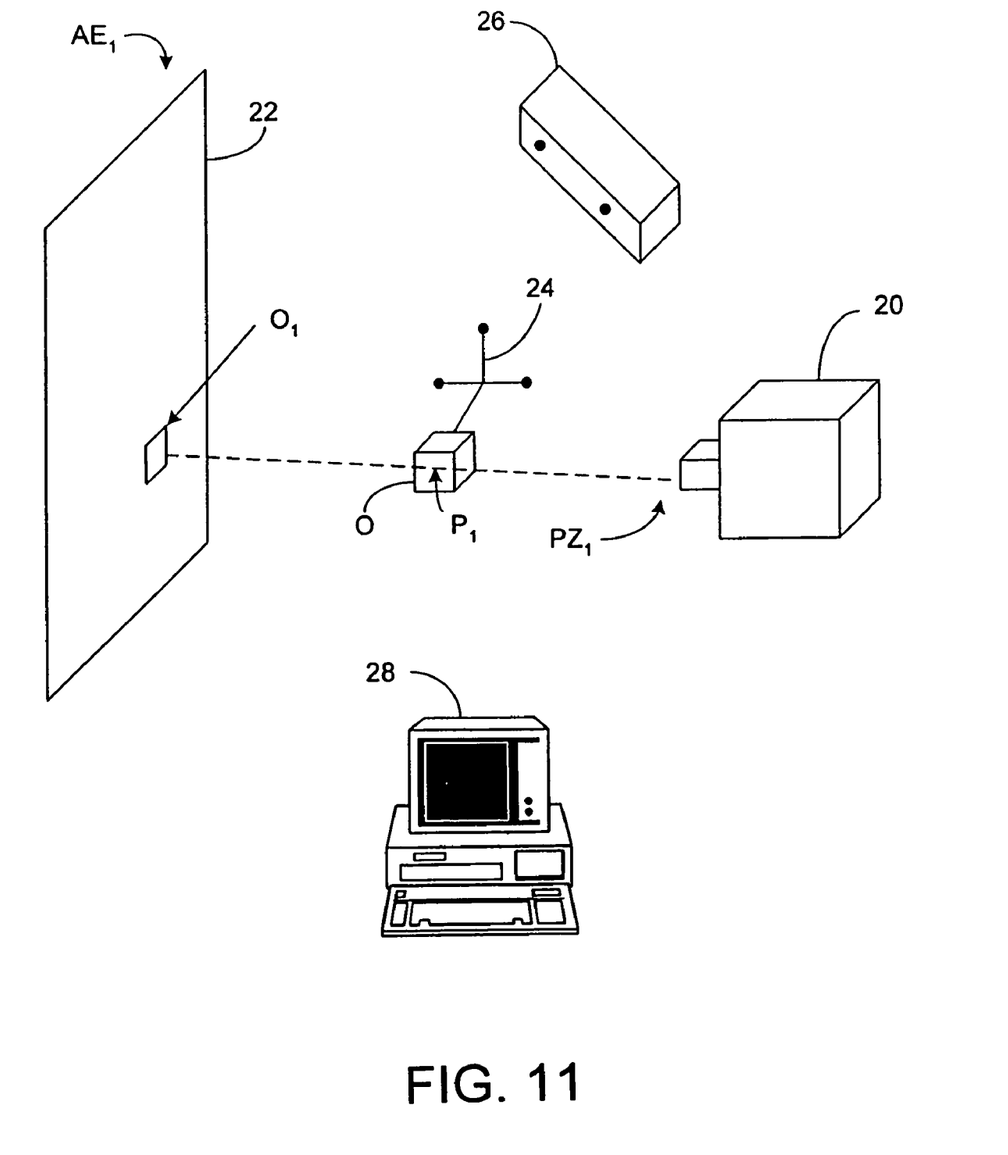
FIG. 11 illustrates a system used to implement the method of the present invention in accordance with an embodiment of the invention.

In accordance with another aspect of the invention, there is provided a device for determining the position of a plane of symmetry of a three-dimensional object. With reference to FIG. 11, the device includes at least one center of projection $PZ_n$, such as, for example, a radiation source 20, and at least one projection plane $AE_1$, such as a radiation sensitive film 22, for example. The projection plane $PZ_1$ can be used to generate a two-dimensional mapping of the three-dimensional object O, e.g., a patient's hip, head, etc. By turning the center of projection $PZ_1$ and/or the projection plane or by using another center of projection $PZ_n$ or another projection plane $AE_n$, a two-dimensional mapping of the three-dimensional object O can be generated. At least one marker, such as reference star 24, is provided and attached to the object O, thereby enabling the positional relationship of the object relative to the at least one center of projection $PZ_1$ and/or the at least one projection plane $AE_1$ to be ascertained. A position detection system 26, e.g., infrared cameras, allow the spatial position of the reference star 24 and, thus, the spatial position of the object O, to be ascertained. Furthermore, a computational unit 28, e.g., a computer, is provided. The computational unit 28 receives at least two two-dimensional mapping data of the three-dimensional object O, the spatial positional data of the object, the center of projection $PZ_1$ and the mapping plane $AE_1$. Using this data, the computational unit 28 can perform the method as described above.

Figure 12:
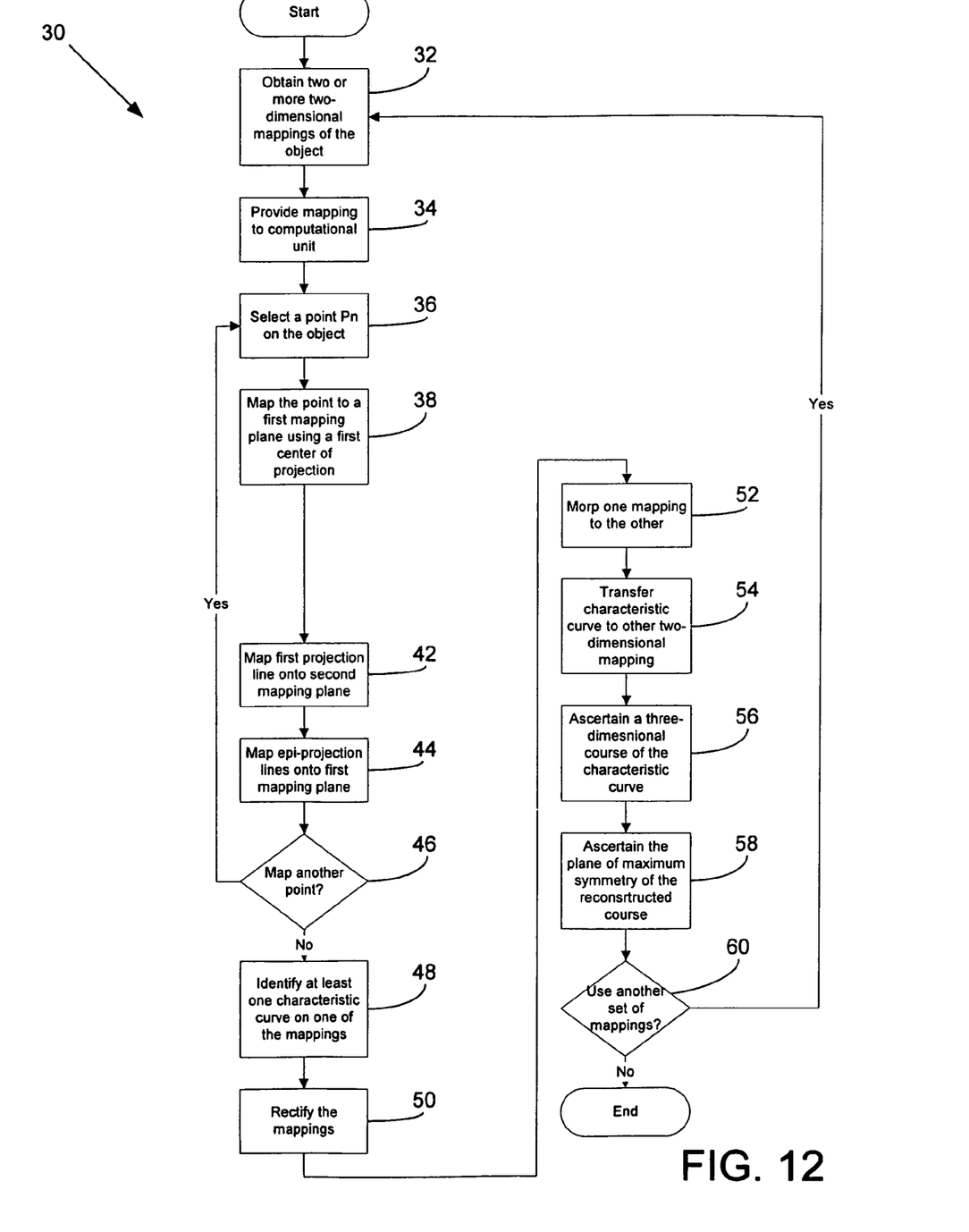
FIG. 12 is a flow diagram for determining the plane of maximum symmetry of an object in accordance with an embodiment of the invention.

Moving now to FIG. 12, a flow diagram 30 illustrating the method of determining a plane of symmetry in accordance with an embodiment of the invention is shown. The flow diagram 30 includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at step 32, two or more two-dimensional mappings $O_1$, $O_2$ of the object O are obtained. The mappings can be obtained, for example, by exposing the object to x-rays using at least two different directions or two different angles, and recording those x-rays on a medium. The mappings $O_1$, $O_2$ then are provided to the computational unit 28 in digital form, for example, as indicated at step 34.

Next, at step 36, a first point $P_1$ is automatically or manually selected on the object O. For example, a user, via a pointing device, can indicate to the computational unit 28 a particular point to be mapped. Alternatively, the computational unit 28 may select the point based on a specified criteria. Once the point is selected, the computational unit 28 maps that point to a first mapping plane $AE_1$ using a first center of projection $PZ_1$, as indicated at step 38. The mapping of the point $P_1$ onto the first mapping plane $AE_1$ creates a first projection line $PAG_1$, which originates at the first center of projection $PZ_1$, intersects the point $P_1$ and terminates at the first mapping plane $AE_1$.

At step 42, the computational unit maps the projection line $PAG_1$ to the second mapping plane $AE_2$, thereby forming epi-polar line $EPB_1$. The projection line $PAG_1$ is mapped by projecting the line $PAG_1$ from the second center of projection $PZ_2$ on to the second mapping plane $AE_2$ using a number of projection lines $PBG_{1,m}$.

At step 44, the computational unit maps the projection line $PBG_{1,m}$ onto the first image plane $AE_1$, thereby forming the epi-polar lines $EPA_n$. The projection line $PBG_{1,m}$ is mapped by projecting the line $PBG_{1,m}$ from the first center of projection $PZ_1$ onto the first mapping plane $AE_1$.

Next, a determination is made on whether to map another point, as indicated at step 44. Generally speaking, the accuracy of the ascertained plane of symmetry 18 of the three-dimensional object O is increased as more points $P_n$ are mapped. As should be apparent, the number of epi-polar lines corresponds to the number of points that are mapped. As more points are mapped, more epi-polar lines are defined and, therefore, the accuracy is increased. If additional points are to be mapped, the computational unit moves back to step 36, another point is selected, and the process is repeated. If sufficient points have been mapped, then the computational unit 28 moves to step 48. The number of points to be mapped can be a predetermined number, based on the overall geometry of the object O, or based on some other criteria.

At step 48, at least one characteristic curve 10, 12 is identified on one of the two-dimensional mappings $O_1$, $O_2$. As was noted previously, the characteristic curve can be manually identified via a user using a pointing device, e.g., a mouse, to select or otherwise identify a characteristic curve, or the computational unit 28 can automatically identify the characteristic curve or curves. Once the characteristic curve has been identified, the computational unit at step 50 rectifies the two mappings. That is, the computational unit 28 rotates the images $O_1$, $O_2$ such that all the epi-polar lines $EPA_n$, $EPB_n$ are parallel. Next, at step 52, the computational unit morphs one mapping into the other using conventional techniques. Alternatively, the two images can be morphed into an average of the two images.

Next, the computational unit transfers the characteristic curve that was identified on one of the mappings to the other mapping, as indicated at step 54. More specifically, and as was noted above, the morphing function applied to the first g also is applied to the characteristic curve, thereby transferring the characteristic curve to the second mapping.

Moving to steps 56 and 58, the computational unit 28 first ascertains a three-dimensional course of the characteristic curve, and then ascertains the plane of maximum symmetry 18 with respect to the characteristic curve using conventional techniques. Finally, at step 60, the computational unit 28 determines whether another set of mappings will be used. As was noted previously, the accuracy of the ascertained plane of symmetry 18 also can be improved by using multiple mappings. The determination on whether to use additional mappings can be based on a user input or on some other criteria, such as, for example, the relative length of the characteristic curve, the size of the object, the symmetry of the object, etc.

The invention further provides a computer program which, when loaded onto a computer system, performs the method as described above. Furthermore, the invention provides a program storage medium or a computer program product comprising such a program.

Figure 13:
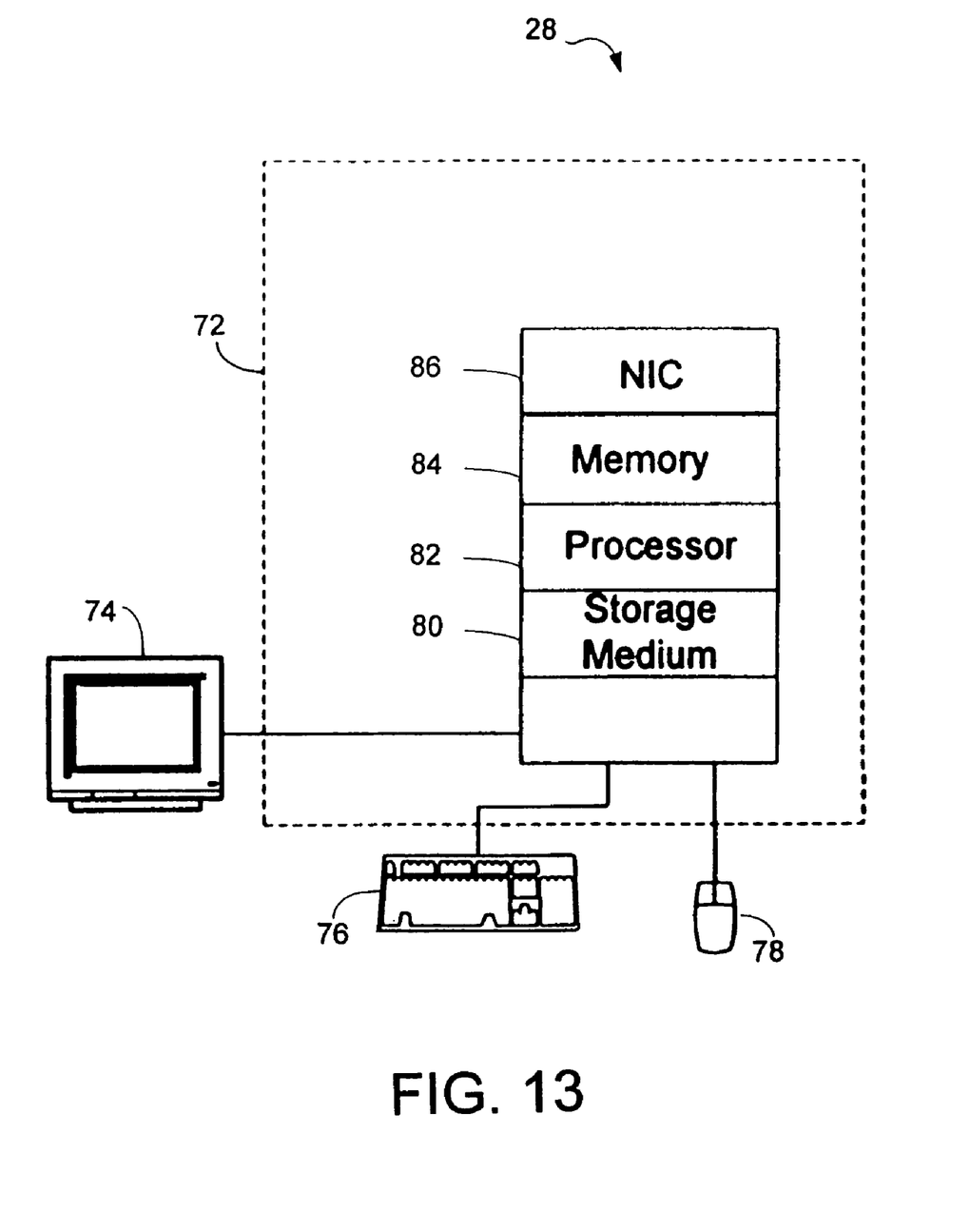
FIG. 13 is a block diagram of a computer system that can be used to implement the method of the present invention.

Moving to FIG. 13, a computational unit 28 for executing a computer program in accordance with the present invention is illustrated. The computational unit 28 includes a computer 72 for processing data, and a display 74 for viewing system information. The technology used in the display is not critical and may be any type currently available, such as a flat panel liquid crystal display (LCD) or a cathode ray tube (CRT) display, or any display subsequently developed. A keyboard 76 and pointing device 78 may be used for data entry, data display, screen navigation, etc. The keyboard 76 and pointing device 78 may be separate from the computer 72 or they may be integral to it. A computer mouse or other device that points to or otherwise identifies a location, action, etc., e.g., by a point and click method or some other method, are examples of a pointing device. Alternatively, a touch screen (not shown) may be used in place of the keyboard 76 and pointing device 78. A touch screen is well known by those skilled in the art and will not be described in detail herein. Briefly, a touch screen implements a thin transparent membrane over the viewing area of the display 74. Touching the viewing area sends a signal to the computer 72 indicative of the location touched on the screen. The computer 72 may equate the signal in a manner equivalent to a pointing device and act accordingly. For example, an object on the display 74 may be designated in software as having a particular function (e.g., view a different screen). Touching the object may have the same effect as directing the pointing device 78 over the object and selecting the object with the pointing device, e.g., by clicking a mouse. Touch screens may be beneficial when the available space for a keyboard 76 and/or a pointing device 78 is limited.

Included in the computer 72 is a storage medium 80 for storing information, such as application data, screen information, programs, etc. The storage medium 80 may be a hard drive, for example. A processor 82, such as an AMD Athlon 64™ processor or an Intel Pentium IV® processor, combined with a memory 84 and the storage medium 80 execute programs to perform various functions, such as data entry, numerical calculations, screen display, system setup, etc. A network interface card (NIC) 86 allows the computer 72 to communicate with devices external to the system 40.

The actual code for performing the functions described herein can be programmed by a person having ordinary skill in the art of computer programming in any of a number of conventional programming languages based on the disclosure herein. Consequently, further detail as to the particular code itself has been omitted for sake of brevity.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for determining the position of a plane of symmetry of a three-dimensional object, comprising the steps of:
   identifying at least one characteristic curve on a first two-dimensional mapping;
   morphing at least the first mapping into a second two-dimensional mapping;
   transferring the at least one characteristic curve to the second mapping;
   back-projecting the characteristic curve of the first and second mappings to obtain a three-dimensional course corresponding to the characteristic curve; and
   ascertaining the plane of symmetry of the three-dimensional object from the three-dimensional course.

2. The method of claim 1, wherein the first and second mappings are acquired from recordings of the object from two different directions.

3. The method of claim 2, wherein the first and second mappings are generated by x-ray recordings of the object.

4. The method of claim 2, wherein the two different directions form an included angle in the range of 5° to 20°.

5. The method of claim 1, further comprising the steps of coupling a position determining element to the object; and tracking the position determining element with respect to at least one center of projection or to at least one mapping plane.

6. The method of claim 1, wherein the at least one characteristic curve is a boundary line and/or a protruding line of the three-dimensional object.

7. The method of claim 1, further comprising the step of rectifying the plurality of images before they are morphed.

8. The method of claim 1, wherein the step of identifying the characteristic curve includes the step of identifying a characteristic curve that is at least partially symmetrical.

9. The method of claim 1, wherein the step of identifying the at least one characteristic curve includes the step of using a pointing device to indicate to a computational unit the location of the at least one characteristic curve of the first mapping.

10. The method of claim 1, wherein the step of identifying the at least one characteristic curve includes the step of executing a computer program to identify the at least one characteristic curve.

11. The method of claim 1, wherein the step of transferring the at least one characteristic curve to the second mapping includes the step of applying a morphing function applied to the first mapping to the at least one characteristic curve.

12. A program embodied in a computer-readable medium for determining the position of a plane of symmetry of a three-dimensional object from a plurality of two-dimensional mappings, comprising:
    code that identifies at least one characteristic curve on a first mapping of the plurality of two-dimensional mappings;
    code that morphs at least the first mapping into a second mapping of the plurality of two-dimensional mappings such that the first mapping and the second mapping are substantially congruent;
    code that transfers the at least one characteristic curve to the second mapping;
    code that back-projects the characteristic curve of the first and second mapping to obtain a three-dimensional course corresponding to the characteristic curve of the first and second mapping; and
    code that ascertains the plane of symmetry of the three-dimensional object from the three-dimensional course.

13. A system for determining the position of a plane of symmetry of a three-dimensional object from a plurality of two-dimensional mappings, comprising:
    a processor circuit having a processor and a memory;
    position determining code stored in the memory and executable by the processor, the position determining code comprising:
        logic that identifies at least one characteristic curve on a first mapping of a plurality of two-dimensional mappings;
        logic that morphs at least the first mapping into a second mapping of the plurality of two-dimensional mappings such that the first mapping and the second mapping are substantially congruent;
        logic that transfers the at least one characteristic curve to the second mapping;
        logic that back-projects the characteristic curve of the first and second mapping to obtain a three-dimensional course corresponding to the characteristic curve of the first and second mapping; and
        logic that ascertains the plane of symmetry of the three-dimensional object from the three-dimensional course.

14. The system of claim 13, further comprising code that generates a plurality of epi-polar lines on the plurality of mappings before morphing the first mapping.

15. The system of claim 14, wherein the logic that morphs at least the first mapping includes logic that morphs along the epi-polar lines.

16. The system of claim 14, wherein the logic that generates a plurality of epi-polar lines includes:
    logic that selects at least one point on the three dimensional object;
    logic that forms a first projection line corresponding to the at least one point, wherein the first projection line intersects the at least one point, has a first end point on a first center of projection, and a second endpoint on a first mapping plane; and
    logic that projects the first projection line corresponding to the at least one point onto a second mapping plane.

17. The system of claim 16, wherein the logic that projects the first projection line includes logic that forms a plurality of second projection lines corresponding to the first projection line, the plurality of second projection lines each intersecting the first projection line and having a first end point on a second center of projection and a second end point on the second mapping plane.

18. The system of claim 17, further comprising logic that projects the plurality of second projection lines onto the first image plane.

19. The system of claim 13, further comprising logic that rectifies the plurality of images before they are morphed.

20. The device as set forth in claim 13, wherein the first and second mappings are acquired by x-ray imaging.

* * * * *